United States Patent [19]

Carroll et al.

[11] 4,290,031
[45] Sep. 15, 1981

[54] COMBUSTOR FOR GAS DYNAMIC LASER

[75] Inventors: Robert G. Carroll, West Palm Beach; John I. Caporini, Palm Beach Gardens; William J. Egan, Lake Park, all of Fla.

[73] Assignee: United Technologies Corporation, Hartford, Conn.

[21] Appl. No.: 58,714

[22] Filed: Jul. 18, 1979

[51] Int. Cl.³ .............................................. H01S 3/05
[52] U.S. Cl. .......................... 331/94.5 G; 331/94.5 D
[58] Field of Search .................... 331/94.5 C, 94.5 D, 331/94.5 G; 422/129; 431/351

[56] References Cited

U.S. PATENT DOCUMENTS 3,779,695 12/1973 Chamberlain ........................ 431/351
4,002,431 1/1977 Lewis ..................................... 422/129
4,108,591 8/1978 Egan, Jr. et al. ............... 331/94.5 G Primary Examiner—William L. Sikes
Assistant Examiner—Leon Scott, Jr.
Attorney, Agent, or Firm—Jack N. McCarthy

[57] ABSTRACT

A gas dynamic laser is formed having a combustor with a cylindrical combustion chamber, said combustion chamber is formed having a discharge opening at one end and primary injection means at the other end with a plurality of injector tubes for injecting a combustible mixture into said combustion chamber; an igniter is included for igniting said mixture; a secondary injection means is located adjacent the discharge opening and has a plurality of nozzle tubes for injecting an oxidizer, one nozzle tube being included for each injector tube; each cooperating nozzle tube and injector tube being axially aligned, with said nozzle tubes directing the oxidizer towards the injector tubes, a mixing chamber being located downstream of the secondary injection means for directing the gases to a nozzle array. The secondary injection means is constructed to have easy accessibility to the nozzle tubes.

12 Claims, 5 Drawing Figures

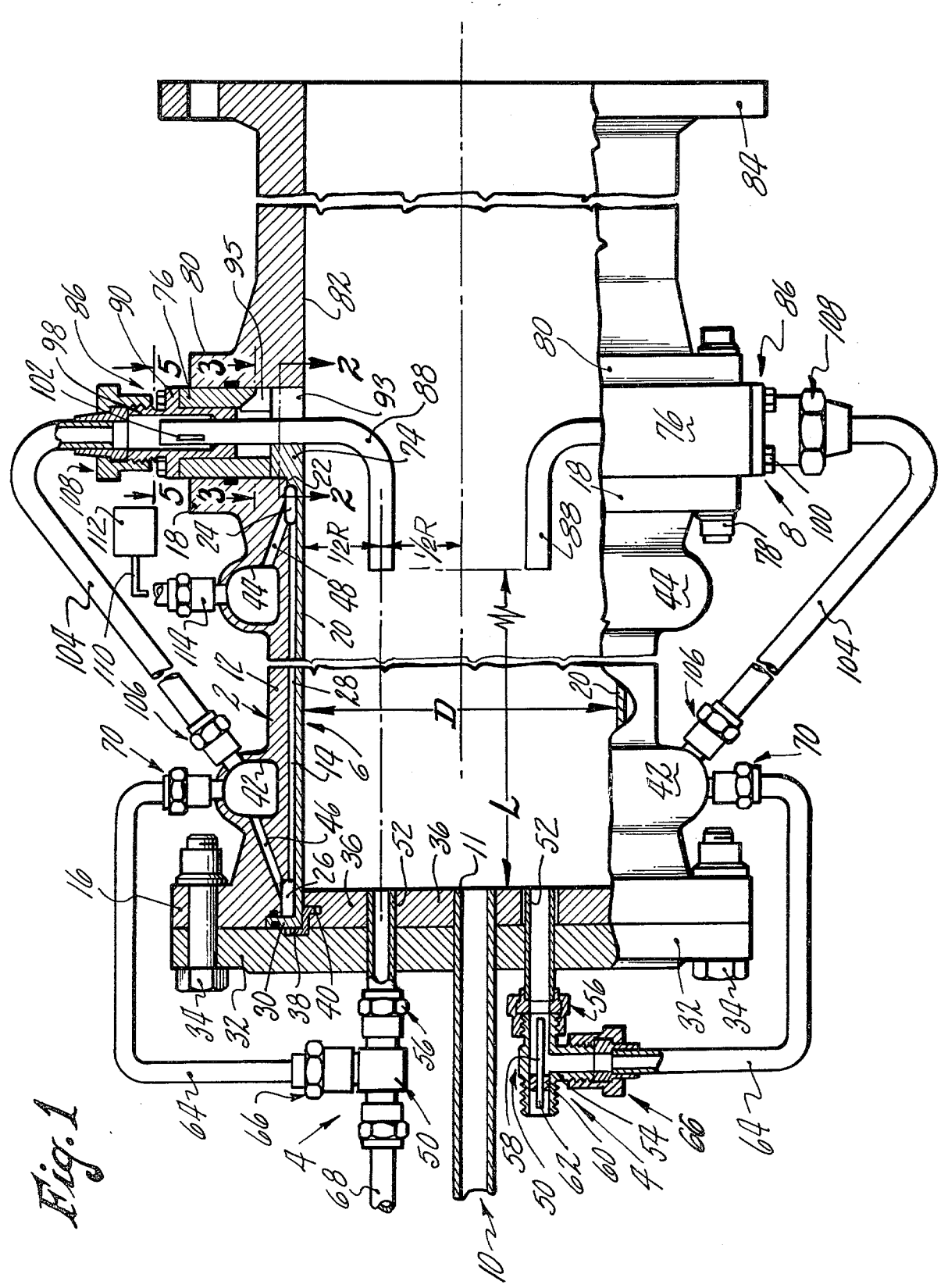

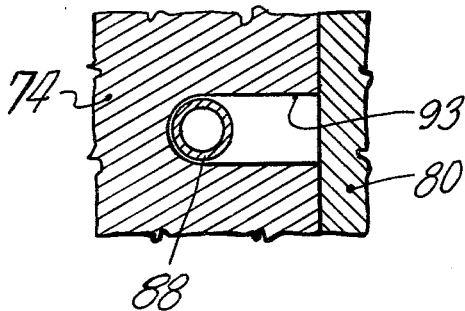
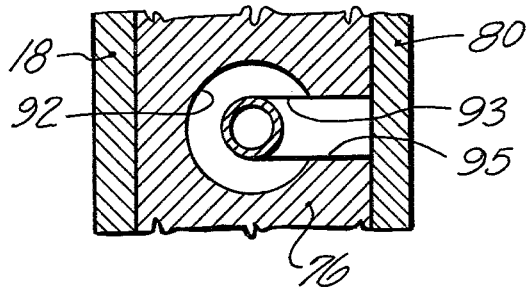
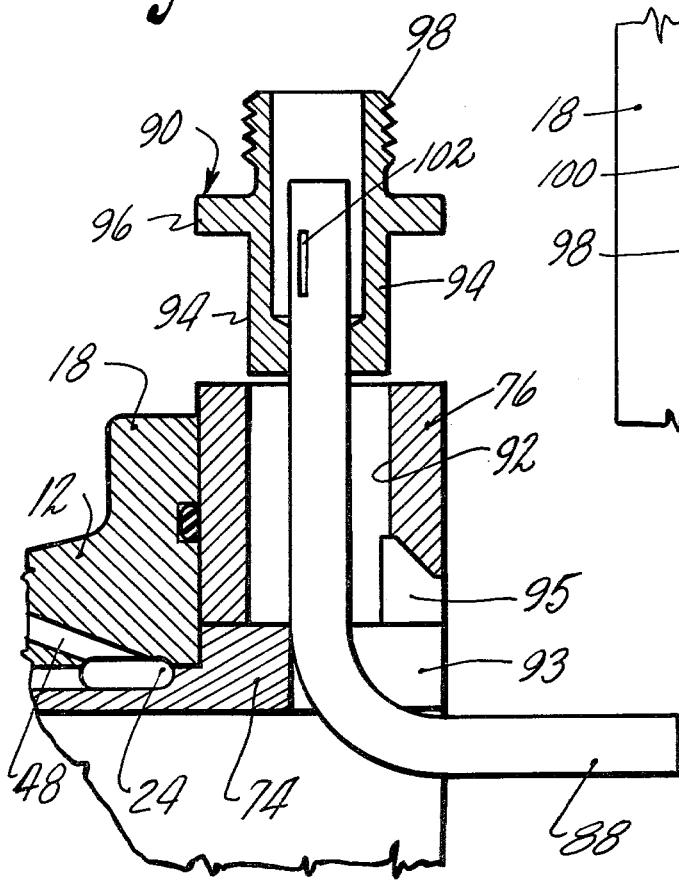

COMBUSTOR FOR GAS DYNAMIC LASER

BACKGROUND OF THE INVENTION

This invention relates to a bireactant gas dynamic laser are more specifically to the use of a combustor having axially aligned primary injector tubes and secondary nozzle tubes with said nozzle tubes being directed forwardly towards the primary injector tubes. A combustor is shown and described in U.S. Pat. No. 4,002,431. A linear combustor is shown and claimed in U.S. Application Ser. No. 58,715 for LINEAR COMBUSTOR FOR GAS DYNAMIC LASER by Robert J. Vogel et al., filed herewith, said application being commonly assigned with subject application. There is also a gas dynamic laser wherein a nozzle array is fed from the side. A construction of this type is shown in U.S. Pat. No. 4,161,285 and U.S. Pat. No. 4,215,823.

SUMMARY OF THE INVENTION

It is an object of this invention to provide a combustor for a bireactant gas dynamic laser which provides stable, efficient, soot-free combustion with uniform temperature and species profiles at the entrance to a laser nozzle array.

Another object of this invention is to provide a combustor having a combustion chamber with primary injection means at one end having a plurality of injector tubes and secondary injection means at the other end having a plurality of nozzle tubes for injecting an oxidizer, there being one nozzle tube for each injector tube with said cooperating tubes being axially aligned, said nozzle tubes directing the oxidizer towards the injector tubes.

A further object of this invention is to provide a primary injection device wherein liquid fuel and part of the oxidizer are premixed before being injected into the combustion chamber. A uniform oxidizer flow is provided at the fuel-oxidizer contact plane at the downstream tip of the fuel tube and the tip of the fuel tube is spaced from the combustion chamber in an injector tube to provide for fuel droplet shattering.

Another object of the invention is to provide a combustor with a primary combustion zone having an L/D of 3 or greater and having a residence time of the injected fuel and oxidizer equal to or greater than 0.014 seconds.

A further object of the invention is to provide secondary injection devices which will provide an opposing oxidizer flow field to obtain complete efficient mixing between the primary zone combustion products and the secondary oxidizer being injected. The mixing zone downstream of the secondary injection plane is sized to provide a residence time equal to or greater than 0.020 seconds for the mixing process between primary zone combustion products and injected secondary oxidizer before it enters the nozzle array.

Another object of the invention is to provide a method of operating a combustor of a gas dynamic laser to obtain stable, efficient, soot-free combustion with uniform temperature and species profiles at the entrance to a laser nozzle array.

A further object of the invention is to provide an arrangement for easy removal of a nozzle tube.

BRIEF DESCRIPTION OF THE DRAWINGS

FIG. 1 is a sectional view taken through the combustion device of a bireactant gas dynamic laser and downstream mixing chamber;

FIG. 2 is a view taken along the line 2—2 of FIG. 1;

FIG. 3 is a view taken along the line 3—3 of FIG. 1;

FIG. 4 is a view showing the downstream nozzles removed and a secondary injector positioned for withdrawal from the combustor; and FIG. 5 is a view taken along the line 5—5 of FIG. 1 showing a holding and positioning member bolted to a top of a ring member for fixing a nozzle tube in position.

DESCRIPTION OF THE PREFERRED EMBODIMENT

With reference to FIG. 1, a combustor 2 for a bireactant gas dynamic laser is shown having four major parts; the primary injector system 4, the combustion chamber 6, the secondary injector system 8, and the torch igniter 10. The combustor 2 is formed having a housing 12 with a cylindrical surface 14 therein. A radially extending flange 16 extends outwardly from the forward edge of the housing 12 and a radial flange 18 extends outwardly from the rearward end of the housing 12. A cylindrical liner member 20 is positioned within the inner surface 14 of the combustor 2. The cylindrical liner member 20 has a sealing flange 22 at the rear end thereof for sealing with an end inner surface on the housing 12. An annular manifold 24 is then formed between the cylindrical liner member 20 and the inner surface of housing 12. A second annular manifold 26 is formed between the forward end of the cylindrical liner member 20 and the inner surface 14 of the housing 12. Grooves 28 extend along the outer surface of the cylindrical liner member 20 between manifold 24 and manifold 26, forming individual cooling passages with cylindrical surface 14. The forward end of the cylindrical liner member 20 has a radially extending flange 30 which fits in a recess formed in the forward face of the flange 16.

A front closure plate 32 is placed over the radially extending flange 16 at the forward edge of the housing 12 and is fixed thereto by a plurality of bolts 34. A portion of the inner surface of closure plate 32 engages the outer face of radially extending flange 30 to fix the cylindrical liner member 20 in place. A primary injector face plate 36 is fixed at the front of the combustion chamber 6 against the closure plate 32. While the injector face plate 36 may be held in place by any means desired, it is shown as being held in place by two semicircular members 38 of Z-shape cross-section wherein one leg of the Z-shape members projects into a circular groove on the surface of the closure plate 32 between the closure plate 32 and the flange 30 of the cylindrical liner member 20, while the other leg of the Z-shape member fits into a groove 40 located along the cylindrical edge of the primary injector face plate 36. The housing 12 has two manifolds 42 and 44 located therearound. Second annular manifold 26 is connected to manifold 42 by passages 46 and annular manifold 24 is connected to manifold 44 by passages 48. The torch igniter 10 includes a flame tube 11 which projects to the front face of primary injector face plate 36. A torch igniter is shown in U.S. Pat. No. 4,002,431. The torch igniter is a gaseous oxygen, gaseous hydrogen torch with a spark igniter. The flame tube 11 is slightly offset downwardly from the center line of the combustion chamber 6 to provide rapid ignition of the combustible mixture at the closest primary injection device 50.

The primary injector system 4 includes six primary injector devices 50, of which two are shown in FIG. 1; these six are equally spaced about the combustion chamber 6. A primary injector device 50 is formed having an ejector tube 52 extending through an opening in closure plate 32 and being fixed thereto, as by bonding, while the inner end of the injector tube 52 projects through an opening in the injector face plate 36 to the inner surface thereof. A T-shape connector 54 has one end of the top of the T connected to the outer end of the injector tube 52 by a connector 56. The other end of the top of the T has a fuel tube 58 fixed therein by a solid annular ring 60. This fuel tube 58 extends into the one end of the top of the T connected to the injector tube 52. The free end of the fuel tube 58 in the other end of the top of the T has three tangential slots 62 positioned therearound so as to inject fuel tangentially into the fuel tube 58 to obtain the proper injection spray with added oxidizer into the injector tube 52. The leg of the T is connected to a conduit 64 by a connector 66. A fuel supply means directs fuel to a conduit 68 which is connected to each other end of the top of the T. This can be done by any fuel supply means and could direct fuel to a manifold connected to a free end of each of the six conduits 68. Conduits 64 are each connected to the manifold 42 by connector 70.

The secondary injector system 8 is located to the rear end of the combustion chamber 6. This secondary injector system 8 includes two ring members 74 and 76. The ring member 74 fits within ring member 76 and provides a function to be hereinafter described. Ring member 76 projects just above the top of radial flange 18. These two ring members 74 and 76 provide the rear end of the combustor 2 and are held in position by bolts 78 which also extend through a forward radial flange 80 on a mixing chamber 82. The mixing chamber 82 is connected to a manifold for distributing gas to laser nozzles by flange 84. A secondary injector device 86 is provided for each primary injector device 50; therefore, six secondary injector devices 86 are positioned around the ring member 76, each with a nozzle tube 88 projecting through ring member 74 into the combustion chamber 6. A secondary injection device 86 is formed having a nozzle tube 88 extending from a holding and positioning member 90. An opening 92 extends through ring member 76 for each secondary injection device 86 and receives a bottom cylindrical portion 94 of a holding and positioning member 90 (see FIG. 4). The ring member 74 also has a cut-out portion 93 for each secondary injection device 96 (see FIG. 2). Opening 92 has a cut-out portion 95 at the bottom thereof to match the cut-out portion 93 for a purpose to be hereinafter described. A radially extending flange 96 extends around a center portion of the holding and positioning member 90 with the bottom cylindrical portion 94 below it and a threaded cylindrical portion 98 above it.

When the secondary injection device 86 is assembled, as shown in FIG. 1, the flange 96 is held in position by bolts 100. Each nozzle tube 88 is fixed at the bottom of a cylindrical portion 94 with the end of the tube projecting into the cylindrical portion 94. Three tangential slots 102 are positioned around the nozzle tube 88 where it projects into a space within the upper part of the holding and positioning member 90. These slots provide the proper injection configuration of the oxidizer leaving the nozzle tube 88. The nozzle end of the nozzle tube 88 has a 90° bend therein with the nozzle end being aligned with the injector tube 52. The center of the aligned portion of the nozzle tube 88 and injector tube 52 is placed at one-half of the radius of the combustion chamber 6.

Manifold 42 has a connection for each secondary injection device 86. A conduit 104 is connected to the manifold 42 by a connector 106 and the other end of conduit 104 is connected to its cooperating threaded cylindrical portion 98 of a secondary injection device 86 by a connector 108. Manifold 44 is connected to a conduit 110 by a connector 114; conduit 110 is in turn connected to an oxidizer supply 112.

In operation, an oxidizer from the oxidizer supply 112 is delivered to manifold 44 through conduit 110; the oxidizer is then delivered through passages 48 to annular manifold 44 where it is directed forwardly through the passages formed by grooves 28 and cylindrical liner member 20 to manifold 26. From manifold 26, the oxidizer is directed through passages 46 to manifold 42. At this point, the oxidizer is divided between the primary injector system 4 and the secondary injector system 8. The oxidizer passes from manifold 44 to each of the primary injector devices 50 by a conduit 64. The oxidizer is delivered to a T-shaped connector 54 where it flows around a fuel tube 58. At this point, the oxidizer is mixed with fuel swirling from fuel tube 58. A fuel supply directs fuel to each primary injector device 50 and is directed into one end of the fuel tube 58 through tangential slots 62. The fuel and oxidizer are mixed in injector tube 52 and ejected into combustion chamber 6. This fuel and oxidizer mixture is ignited in the combustion chamber 6 and burns in the primary combustion zone, which extends from the primary injector face plate 36 to the forward ends of the nozzle tubes 88. The oxidizer passes from manifold 44 to each of the secondary injector devices 86 by conduit 104. The oxidizer is delivered to one end of each nozzle tube 88 where it is directed into the nozzle tube through tangential slots 102. The oxidizer flows through each nozzle tube 88 and is directed forwardly therefrom, forming a swirling flow field. At this field, the products of combustion from the primary combustion zone mix with the secondary oxidizer and react to decompose the secondary oxidizer; this is done in a secondary mixing zone downstream.

To remove a nozzle tube 88 and its associated holding and positioning member 90 to which it is fixed, the mixing chamber 82 is unbolted by removal of bolts 78. The nozzle tube 88, desired to be replaced, then has its associated bolts 100 removed, releasing flange 96 from ring member 76. The nozzle tube 88 and its associated holding and positioning member 90 can then be rotated and placed with the nozzle tube 88 facing rearwardly. For complete removal, the nozzle tube 88 is moved upwardly, as shown in FIG. 4, and then further, with the curved portion of the nozzle tube 88, moving upwardly through the cut-out portion 93 of ring member 74 and cut-out portion 95 of ring member 76. In this position, the nozzle tube can be withdrawn by a curved movement rearwardly, removing the nozzle tube 88 through the opening 92.

In a construction of this combustor, the L/D of the zone of combustion chamber 6 should be made 3 or greater. In a combustor built, the L/D was made approximately 3 and the ratio of the number of all of the injector tubes 52 to the area of the primary injector face plate 36 was made 0.17 injection elements per square inch (0.03/square centimeter). The downstream tip of the fuel tube 58 was located so as to provide sufficient length from the leg of the T-shaped connector 54 to insure uniform oxidizer flow at the fuel-oxidizer contact plane. This should provide a ratio of the length of the fuel tube 58 from the leg of the T to the diameter of the one end of the top of the T equal to approximately 4. The fuel tube 58 has its diameter sized to achieve a desired pressure drop with respect to the pressure in combustion chamber 6. The diameter of the top of the T (carrying the oxidizer) is then sized to provide a desired momentum ratio. In the construction built, a momentum ratio of 60 was used.

The downstream tip of the fuel tube 58 was also located so as to provide sufficient time from this plane of initial fuel-oxidizer contact to the combustion chamber 6 for fuel droplet shattering to occur, typically 0.00001 seconds. This shattering of the fuel droplets was provided by a high oxidizer-to-fuel momentum ratio, of 60 or greater, resulting in fuel droplet sizes of 10 microns or less at this combustion chamber 6. The fuel used was liquid benzonitrile (a liquid hydrocarbon such as JP-4 could also be used). The extremely small fuel droplet size of 10 microns provides rapid, stable soot-free combustion in the combustion chamber 6 when the primary combustion zone of the combustion chamber 6 has an L/D of 3.0 or greater and the residence time of the injected fuel and oxidizer in said primary combustion zone is equal to or greater than 0.014 seconds.

The secondary oxidizer is injected through nozzle tubes 88 into the combustion chamber 6 as an opposing swirling field of flow. The oxidizer used was $N_2O$ (a blend such as $N_2O/CO_2$ could also be used). The opposing flow field provides complete efficient mixing between the primary zone combustion products and the secondary oxidizer. The mixing zone in mixing chamber 82 downstream of the secondary injection plane was sized to provide a residence time equal to or greater than 0.020 seconds for the mixing process between primary zone combustion products and injected secondary oxidizer before it leaves the mixing chamber 82 and enters the nozzle array. Approximately equal amounts of the oxidizer were delivered to the primary injection system 4 and the secondary injection system 8.

We claim:

1. In a gas dynamic laser device; a combustor, said combustor having a combustion chamber with a discharge opening at one end; primary injection means for injecting a combustible mixture into said combustion chamber at the other end of the chamber; said primary injection means having a plurality of injector tubes; an igniter for igniting a combustible mixture; secondary injection means located adjacent the discharge opening for ejecting an oxidizer into said combustion chamber; said secondary injection means having a plurality of nozzle tubes, one nozzle tube for each injector tube of said primary injection means; each nozzle tube and injector tube being axially aligned with said nozzle tubes directing the oxidizer towards the injector tubes.

2. In a device as set forth in claim 1, each injector tube having a premixing chamber for premixing the fuel and oxidizer before injection into said combustion chamber.

3. In a device as set forth in claim 1, means for directing an oxidizer to said injector tube; means for directing a fuel to said injector tube; said means for injecting an oxidizer including a tube of approximately the same diameter as said injector tube; said means for injecting fuel having a fuel tube extending down the center of said oxidizer tube; the length of the fuel tube forming a ratio of its length to the diameter of the oxidizer tube of approximately 4.

4. In a device as set forth in claim 1, said combustion chamber being cylindrical and having a primary combustion zone with an L/D of 3 or greater where L is the distance between the primary injection means and the secondary injection means.

5. In a device as set forth in claim 4 wherein the residence time of the combustion products in the primary combustion zone is 0.014 seconds.

6. In a device as set forth in claim 1, said primary injection means having a circular injector face plate, said injector tubes being mounted around said injector face plate along a circle formed at one-half of the radius of said injector face plate; each of said nozzle tubes also directing the oxidizer forwardly around a circle formed at one-half of the radius of said injector face plate.

7. In a device as set forth in claim 6 wherein the ratio of the number of all of the injector tubes to the area of the injector face plate is approximately 0.17 injection tubes per square inch.

8. A device as set forth in claim 1 wherein said secondary injection means injects said oxidizer as an opposing swirling flow field.

9. A method of operating a cylindrical gas dynamic laser combustor to obtain stable efficient soot-free combustion with uniform temperature and species profiles at the entrance to a laser nozzle array including the steps of,
   (1) forming a combustion zone having an L/D ratio of 3 or greater;
   (2) premixing an oxidizer and fuel to provide a uniform fuel-oxidizer mixture and injecting it into said zone from its forward end;
   (3) providing a residence time of the injected fuel and oxidizer equal to or greater than 0.014 seconds in said zone;
   (4) injecting an oxidizer at the end of said zone at a secondary injection plane in the opposing direction to the injection of the injected fuel and oxidizer for forming an opposing oxidizer flow field where the primary zone combustion products and the secondary oxidizer start mixing;
   (5) sizing a mixing zone downstream of the secondary injection plane to provide a residence time equal to or greater than 0.020 before the mixing process enters the nozzle array.

10. A method as set forth in claim 9 wherein the premixing step (2) includes a liquid fuel, said liquid fuel being shattered to form droplets.

11. A method as set forth in claim 10 wherein said droplets formed are 10 microns or less.

12. A method as set forth in claim 10 wherein said premixing step (2), a fuel-oxidizer momentum ratio is formed of 60 or greater to provide shattering of the liquid fuel to form droplets.

* * * * *